S. S. & J. P. CLARY.
Corn and Cotton Planter.
No. 206,089. Patented July 16, 1878.
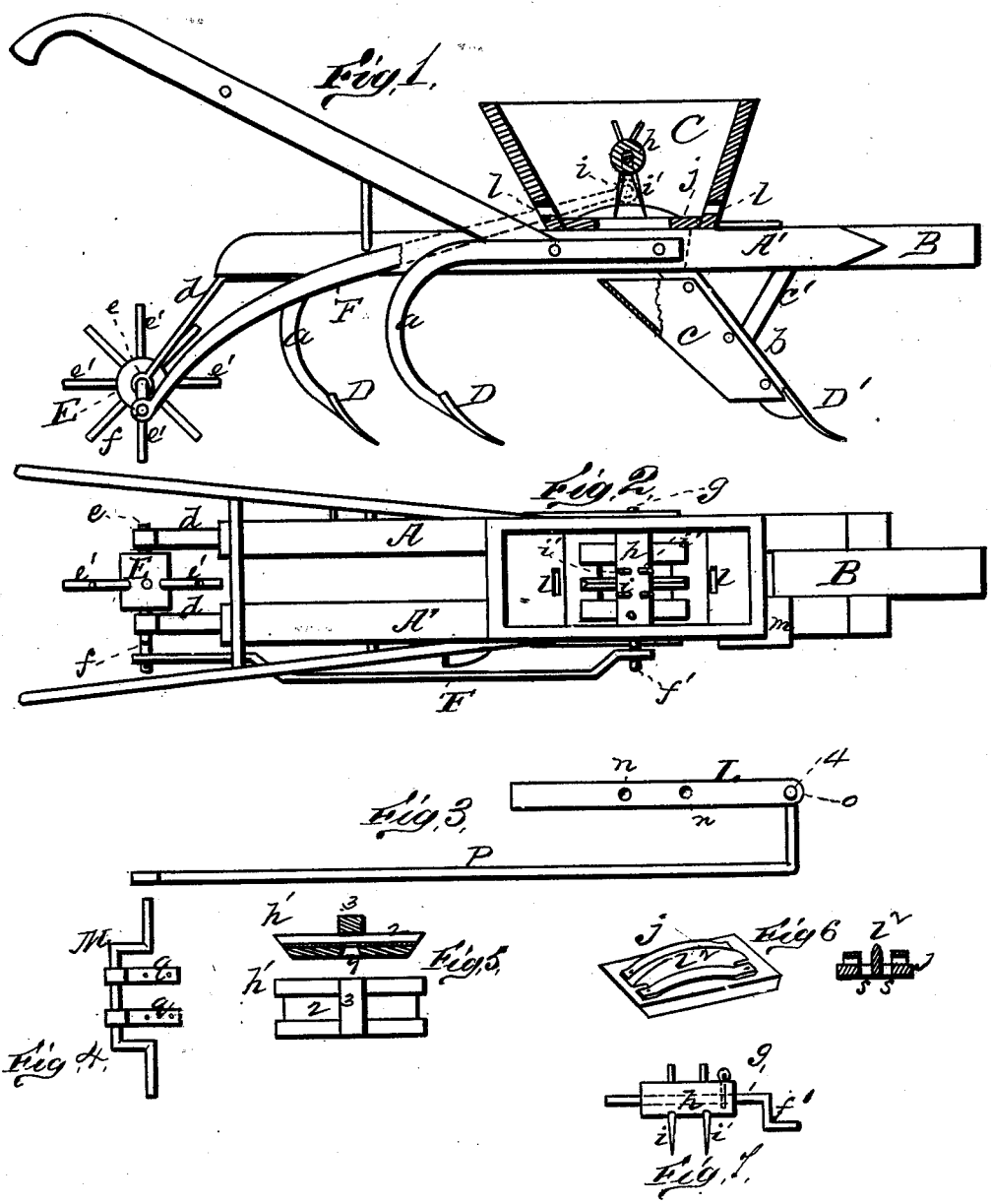
WITNESSES
INVENTORS
Stephen S. Clary
John P. Clary
by E. W. Anderson,
ATTORNEY

UNITED STATES PATENT OFFICE.

STEPHEN S. CLARY AND JOHN P. CLARY, OF BELTON, TEXAS.

IMPROVEMENT IN CORN AND COTTON PLANTERS.

Specification forming part of Letters Patent No. 206,089, dated July 16, 1878; application filed May 18, 1878.

*To all whom it may concern:*

Be it known that we, STEPHEN S. CLARY and JOHN P. CLARY, of Belton, in the county of Bell and State of Texas, have invented a new and valuable Improvement in Corn and Cotton Planters; and we do hereby declare that the following is a full, clear, and exact description of the construction and operation of the same, reference being had to the annexed drawings, making a part of this specification, and to the letters and figures of reference marked thereon.

Figure 1 of the drawings is a representation of a side view of my invention. Fig. 2 is a top view thereof, and Figs. 3, 4, 5, 6, and 7 are details.

This invention has relation to improvements in corn-planters that are convertible at pleasure into a machine for planting cotton.

The nature of the invention will be clearly seen from the following description and claim appended thereto.

In the accompanying drawings, the letters A A' designate the beams of my improved planter, connected by means of strong bolts to a draft-tongue, B, and supporting an open-bottomed hopper, C, near their front ends. The beams carry each a covering shovel-plow, D, the said shovels being the one in advance of the other and secured to the ends of the curved metallic standards $a$. D' indicates the opening-shovel secured to a standard, $b$, the upper end of which is bolted to the beams A A' in the space between them below the hopper. The standard $b$ carries the spout $c$, and is braced to the tongue by means of a rod, $c'$.

At the rear end of the beams A A' are secured the metallic arms $d$, that afford bearings to a shaft, $e$, upon which is keyed or otherwise rigidly secured a hub, E, carrying a number of radial spokes, $e'$, the free ends of which may be ferruled or metal-shod.

The end of shaft $e$ terminates in a crank-arm, $f$, to which is applied a pitman, F. The remaining end of this pitman engages a crank-arm, $f'$, upon a shaft, $g$, extending through the hopper, and provided with a hub, $h$, carrying a number of spaced radial arms, $i\ i^1$.

At the bottom of the hopper is a removable plate, $j$, having a rectangular opening in it, divided by a raised angular partition, $i^2$, into two narrow slots, $s$, through which the cotton-seeds drop into the spout.

The rotating of the driving spurred hub imparts a rocking motion to the hopper-hub $h$, and causes the spurs or arms $i\ i^1$ to alternately open and close the slots $s$.

This planter is converted into a machine for dropping corn as follows: The spurred hub $h$ is detached from the hopper, and its plate $j$ removed. A second bottom, $h'$, having a central aperture, 1, and a longitudinal groove, 2, bridged by a strike, 3, immediately over said aperture, is substituted for the plate $j$, and a metallic slide inserted into the hopper through slots $l$ in its front and rear, and connected at its front end with the radially-spoked hub E, by means of a pitman, P, reciprocating on a bearing-plate, $m$, on the beam A. The slide L reciprocates in the groove 2 of bottom $h$, and its seed-openings $n$ are alternately brought over the aperture 1 aforesaid, so as to deliver to the spout through said aperture.

The pitman P is bent at its front end so as to extend around the front end of the hopper, and is provided with an upwardly-projecting spur, 4, that enters an eye, $o$, in the front end of the said slide.

This corn and cotton planter may be secured to any riding cultivator by taking off the rear shovels, the front shovel being retained to open the furrow by means of the iron crank-rod M. This rod is fastened to the beams A A' by means of bolts extending through the metal bearings $q$, and the ends of said rod clamped to the axle of the cultivator.

What we claim as new, and desire to secure by Letters Patent, is—

The combination, with the hopper C, having removable slotted plate $j$, provided with the raised angular rib, forming slots $s$, and the hub $h$, having spaced arms $i\ i^1$, engaging said slots, and the crank-arm $f'$, of the pitman F, shaft $e$, crank-arm $f$, and hub E, having radial arms $e'$, substantially as specified.

In testimony that we claim the above we have hereunto subscribed our names in the presence of two witnesses.

STEPHEN S. CLARY.
    JOHN P. CLARY.

Witnesses:
  J. L. CUNNINGHAM,
  F. H. AUSTIN.